(12) United States Patent
Zarian et al.

(10) Patent No.: US 7,213,934 B2
(45) Date of Patent: May 8, 2007

(54) LIGHT EMITTING MEDIUM AND ILLUMINATION SYSTEM

(76) Inventors: James Rouben Zarian, 2707 Blue Water Dr., Corona del Mar, CA (US) 92625; Brandon Jonathan Zarian, 2707 Blue Water Dr., Corona del Mar, CA (US) 92625

( * ) Notice: Subject to any disclaimer, the term of this patent is extended or adjusted under 35 U.S.C. 154(b) by 0 days.

(21) Appl. No.: 10/984,444

(22) Filed: Nov. 9, 2004

(65) Prior Publication Data

US 2006/0098422 A1  May 11, 2006

Related U.S. Application Data

(63) Continuation of application No. PCT/US03/14554, filed on May 8, 2003.

(60) Provisional application No. 60/424,072, filed on Nov. 7, 2002, provisional application No. 60/393,544, filed on Jul. 5, 2002, provisional application No. 60/388,857, filed on Jun. 17, 2002, provisional application No. 60/384,236, filed on May 31, 2002, provisional application No. 60/378,787, filed on May 9, 2002.

(51) Int. Cl.
*F21V 33/00* (2006.01)

(52) U.S. Cl. .......... 362/101; 362/318; 362/96; 40/439

(58) Field of Classification Search .......... 362/556, 362/582, 101; 385/125
See application file for complete search history.

(56) References Cited

U.S. PATENT DOCUMENTS 3,814,497 A  6/1974 Stone (Continued)

*Primary Examiner*—Ali Alavi
*Assistant Examiner*—Hargobind S. Sawhney
(74) *Attorney, Agent, or Firm*—Katten Muchin Roseman LLP; John S. Paniaguas

(57) ABSTRACT

The present invention relates to a light emitting medium which includes a container and a liquid core. In accordance with an important aspect of the invention, the liquid core includes an aqueous solution or mixture of a water-soluble polymer. The refractive indices of the liquid core and that of the container may be different. However, the aqueous solution or mixture may have a lower or higher refractive index than that of the container. The mixture may be completely transparent or translucent and have a color other than clear. The container may be of any material that is translucent or transparent and be of any color.

The raw materials for the light emitting medium in accordance with the present invention are less costly than known light guides and offer numerous advantages when compared to other illumination light guides. Water advantageously is a major raw material of the present invention. The water-soluble polymer component may be used in relatively minute amounts. For example, a liquid core in accordance with the present invention can be formed from up to 99.9% water and 0.01% water-soluble polymers, although higher amounts of water-soluble polymer may result in better characteristics. The container material may be formed from typically available polymers, such as polyvinyl chloride, acrylics and methacrylics or polyolefins and be formed by commonly known processes, such as extrusion, blow-molding and injection molding.

In one embodiment of the invention, the light emitting medium in accordance with the present invention is combined with at least one light emitting diode (LED), a power source and a switching device to form a self contained illumination device. In another embodiment of the invention, images are formed on the container in different colors. Multiple LEDs of various wavelengths are selectively illuminated to simulate motion of the images.

1 Claim, 5 Drawing Sheets

U.S. PATENT DOCUMENTS

| | | | |
|---|---|---|---|
| 4,009,382 A * | 2/1977 | Nath ........................... 362/582 |
| 4,045,119 A * | 8/1977 | Eastgate ..................... 385/125 |
| 4,201,446 A | 5/1980 | Geddes et al. |
| 4,505,542 A * | 3/1985 | Clarke ........................ 385/127 |
| 4,747,662 A | 5/1988 | Fitz |
| 4,868,261 A | 9/1989 | Kobayashi et al. |
| 5,113,477 A * | 5/1992 | Eguchi et al. .............. 385/143 |
| 5,333,227 A * | 7/1994 | Ishiharada et al. .......... 385/100 |
| 5,412,750 A | 5/1995 | Nath |
| 5,584,965 A | 12/1996 | Ogata et al. |
| 5,638,480 A * | 6/1997 | Ishiharada et al. .......... 385/125 |
| 5,684,908 A * | 11/1997 | Kross et al. ................. 385/125 |
| 5,717,807 A | 2/1998 | Theroux et al. |
| 5,737,473 A * | 4/1998 | Nath ........................... 385/125 |
| 5,799,124 A * | 8/1998 | Zorn et al. .................. 385/125 |
| 5,861,129 A | 1/1999 | Katoot |
| 5,896,483 A * | 4/1999 | Wojcik et al. .............. 385/125 |
| 6,135,604 A * | 10/2000 | Lin ............................. 362/101 |
| 6,418,257 B1 * | 7/2002 | Nath ........................... 385/125 |
| 6,526,213 B1 * | 2/2003 | Ilenda et al. ................ 385/143 |

\* cited by examiner

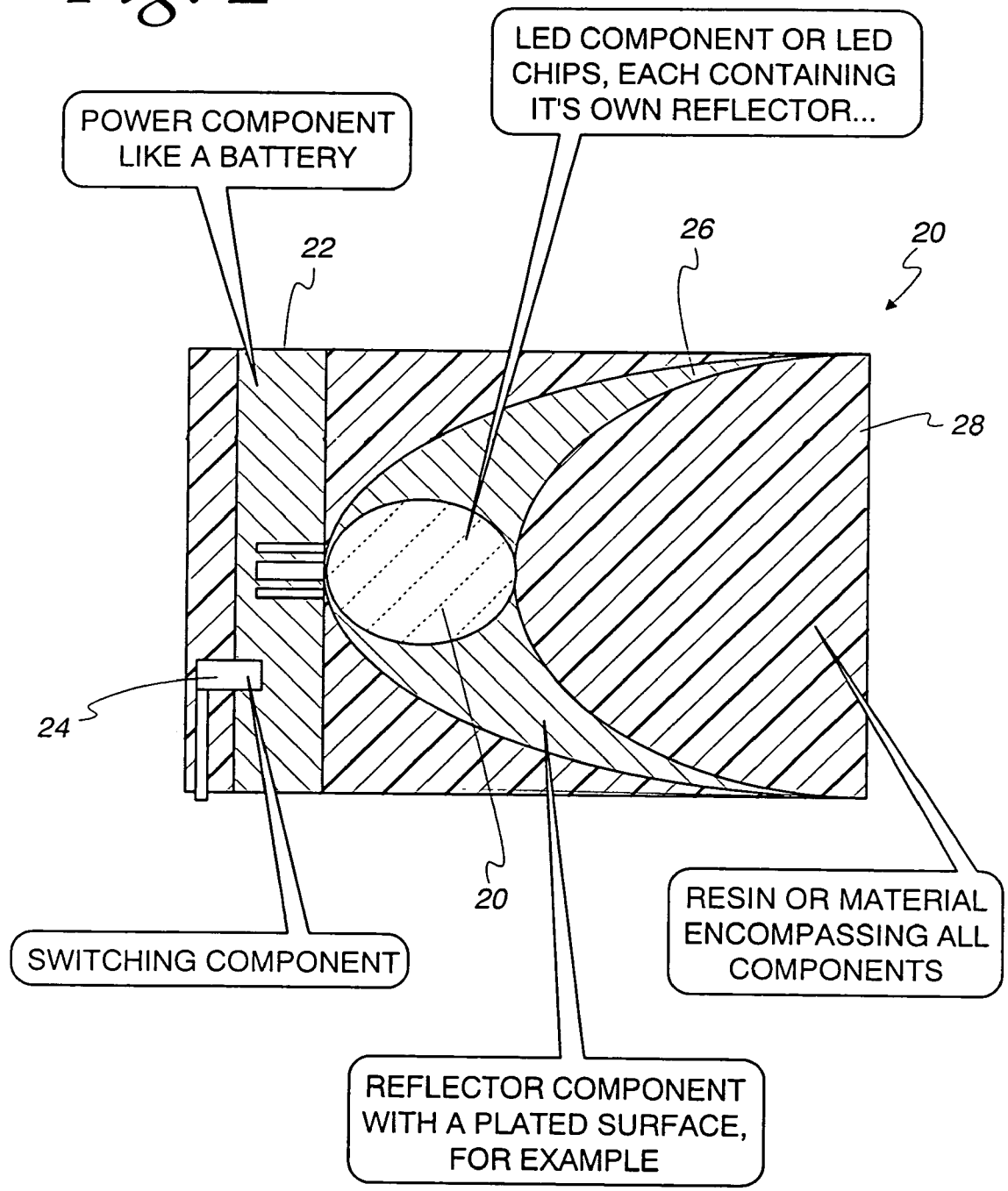

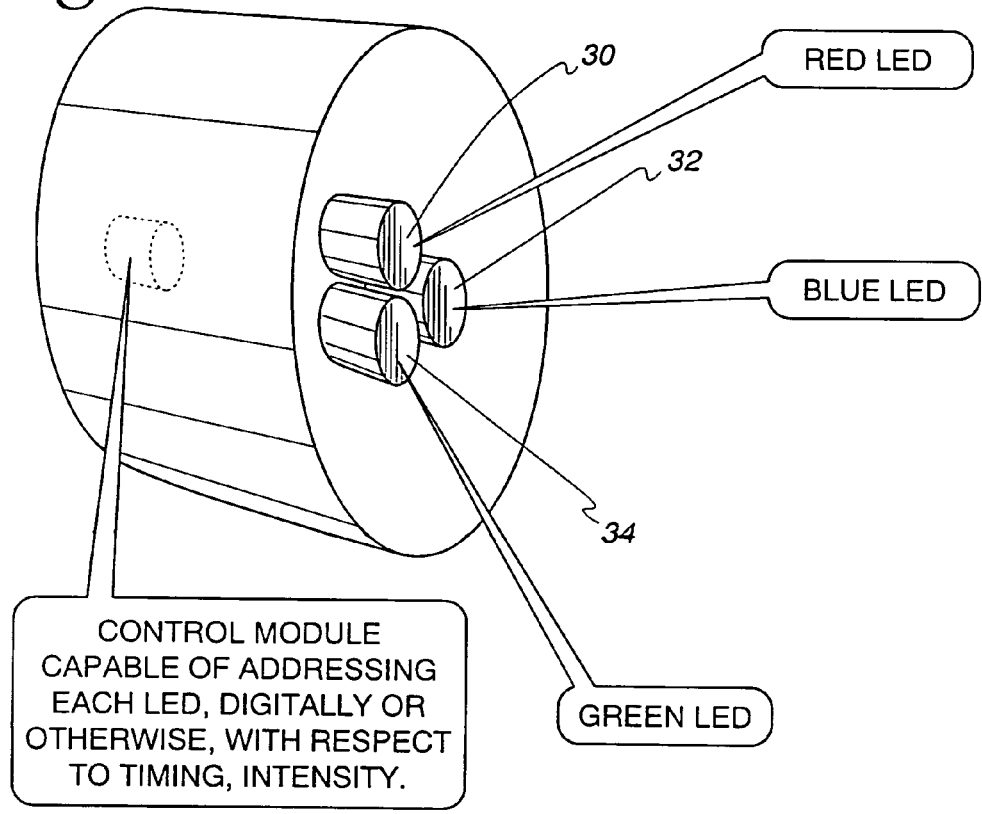
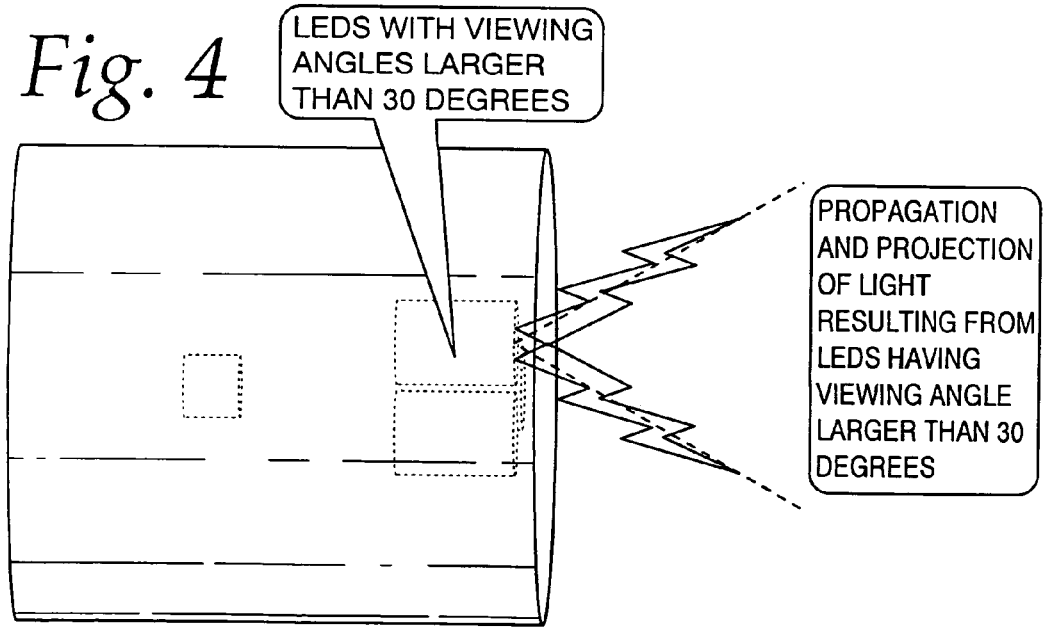

LIGHT EMITTING MEDIUM AND ILLUMINATION SYSTEM

CROSS REFERENCE TO RELATED APPLICATIONS

The present application is a continuation of International Application No. PCT/US2003/14554, filed May 8, 2003, which, in turn, claims the benefit of and priority to the following U.S. Provisional Patent Applications: Application No. 60/378,787, filed on May 9, 2002; Application No. 60/384,236, filed on May 31, 2002; Application No. 60/388,857, filed on Jun. 17, 2002; Application No. 60/393,544, filed on Jul. 5, 2002; and Application No. 60/424,072, filed on Nov. 7, 2002.

BACKGROUND OF THE INVENTION

1. Field of the Invention

The present invention relates to light emitting medium and an illumination system for transmitting light at one or more wavelengths. The light emitting medium is formed from a translucent or transparent container and a core formed from a mixture which includes an aqueous solution of a water soluble polymer. The illumination system includes an illumination assembly which includes, for example, a light source, such as, one or more light emitting devices (LEDs), a power source, such as a battery, and a switching device, forming a self contained illumination system assembled to a light guide as discussed above. The illumination system may optionally be configured to simulate motion by forming or printing images on the container and selectively switching LEDs of different wavelengths.

2. Description of the Prior Art

Various lighting systems are known using light emitting diodes (LEDs). These lighting systems include LED arrays, clusters, traffic lights and automotive tail lights. LEDs have been the center of focus because of aesthetic, design flexibility, color changing, long life, small physical dimensions and other attributes that together advantageously serve the intended markets. LEDs as a source of light offer many advantages; however, their usefulness is enhanced by the use of optical elements, such as light guides, lenses, refractors, reflectors to disperse, reflect and refract light. As such, LEDs have been combined with various light conduits, such as so called "optical fibers", "fiber optics", "light pipes" and "light guides", collectively categorized as light guides. Lenses, refractors and reflectors among other optical elements are also used to create lighting systems have also been combined with LEDs. These lighting systems find use in markets, such as sign, displays, architectural and transportation.

Light guides are normally made out of polymers, glass, metals or liquids, which require costly raw materials and/or processes. In particular, light guides, such as the ones disclosed in U.S. Pat. Nos. 5,052,778 and 4,957,347, assigned to Lumenyte International Corporation, Irvine, Calif.; U.S. Pat. No. 6,278,827, assigned to Bridgestone Corporation, Tokyo, Japan; U.S. Pat. Nos. 5,406,641 and 5,485,541, assigned to Rohm and Haas Company, Philadelphia, Pa.; and U.S. Pat. Nos. 5,898,810 and 6,535,667, assigned to Minnesota Mining and Manufacturing Company, St. Paul, Minn. and others, are formed from an outer sheath or cladding and a core. A polymer of a higher refractive index material is used for the "core" and a relatively lower refractive index material is used for the "cladding". Essentially, the cores of such light guides are formed by polymerizing precursor monomers into solid polymers capable of transmitting light efficiently. In many instances, the core is a cross-linked polymer. The cladding is also a polymer of lower refractive index. In general, known light guides all require relatively costly raw materials. Additionally, the apparatus and methods used to manufacture these light guides are cumbersome, capital intensive, and require skilled labor and in some instances are not environmentally sound.

Another class of light guides, for example, as disclosed in U.S. Pat. Nos. 4,261,936 and 5,111,526, assigned to Mitsubishi Rayon Co., Ltd., Tokyo, Japan, are formed with substantially smaller diameters and are produced differently than the light guides discussed above. In particular, to achieve lighting effects, a bundle of such light guides are encased in a plastic sheeting. Unfortunately, these light guides suffer from the same shortcomings as discussed above.

Another type of light guide in the same category, manufactured by the Bridgestone Corporation, Tokyo, Japan and disclosed in detail in U.S. Pat. No. 6,488,397, discloses a light guide with a strip of reflective material placed at the core-clad interface to disperse the light. In such a light guide, the light dispersion is directional, and the material is very rigid and difficult to work with.

In yet another class of light guides, liquid light guides are disclosed. These light guides are normally formed from a thermoplastic cladding and a liquid core. Such liquid light guides fall in two main categories. The first category, used in the medical industry, is intended to transmit light from one point (input end) to the end point (distal end), for example, as disclosed in U.S. Pat. Nos. 5,452,395, 6,418,257 and 6,507,688. The manufacturing processes for the production of this class of light guides is rather specialized and cost prohibitive for many applications. Normally, a very concentrated salt solution is used for the liquid core. In the second category, for example, as disclosed in U.S. Pat. Nos. 5,799,124 and 5,896,483, illuminating systems for decorative applications are presented. In the latter category, the use of liquids is limited to non-aqueous liquids.

In general, the above light guides are used to create an effect. For example, an LED light is used to introduce light into the light guide, such as the polymer light guides disclosed above, to create a "neon effect". Neon, a commonly known lighting medium, glows from the sides when activated. This effect is known as neon effect. The light guides disclosed in the U.S. Pat. Nos. 5,052,778, 4,957,347, 6,278,827, 5,406,641 and 5,485,541, 5,799,124, 5,898,810 and 6,535,667 in part, disclose such light guides.

In traditional neon illumination systems, a powerful and prohibitively costly halogen, high intensity discharge or xenon lamp is used as a source light. These highly inefficient lamps, along with other related components are normally housed in an enclosure, known as an "illuminator". These illuminators are notoriously known to be energy-hungry, expensive, bulky, noisy, inefficient, fragile and have a short lamp life requiring costly maintenance. Additionally, the light coupling into the optics was known to be very inefficient and not user friendly. As a result of these deficiencies the growth of the industry has been rather limited.

The light guides discussed above in combination with on or more LEDs have been used to create illumination systems to solve the problems associated with traditional neon light systems. However, the light guides discussed above, due to the relatively high cost of raw materials, are relatively expensive to manufacture and thus are relatively limited in their applications. Thus, there is a need for light guide which can be formed from relatively less expensive raw materials and can be used in a wider range of applications than known light guides.

SUMMARY OF THE INVENTION

The present invention relates to a light emitting medium which includes a container and a liquid core. In accordance with an important aspect of the invention, the liquid core includes an aqueous solution or mixture of a water-soluble polymer. The refractive indices of the liquid core and that of the container may be different. However, the aqueous solution or mixture may have a lower or higher refractive index than that of the container. The mixture may be completely transparent or translucent and have a color other than clear. The container may be of any material that is translucent or transparent and be of any color.

The raw materials for the light emitting medium in accordance with the present invention are less costly than known light guides and offer numerous advantages when compared to other illumination light guides. Water advantageously is a major raw material of the present invention. The water-soluble polymer component may be used in relatively minute amounts. For example, a liquid core in accordance with the present invention can be formed from up to 99.9% water and 0.01% water-soluble polymers, although higher amounts of water-soluble polymer may result in better characteristics. The container material may be formed from typically available polymers, such as polyvinyl chloride, acrylics and methacrylics or polyolefins and be formed by commonly known processes, such as extrusion, blow-molding and injection molding.

In one embodiment of the invention, the light emitting medium in accordance with the present invention is combined with at least one light emitting diode (LED), a power source and a switching device to form a self contained illumination device. In another embodiment of the invention, images are formed on the container. Multiple LEDs of various wavelengths are selectively illuminated to simulate motion of the images.

DESCRIPTION OF THE DRAWING

These and other advantages of the present invention may be readily appreciated with reference to the following specification and attached drawing wherein:

FIG. 2 is a cross-sectional view of an illumination device in accordance with one aspect of the invention.

FIG. 3 is a perspective view of one embodiment of the present invention illustrating three LEDs.

FIG. 4 is an elevational view of an embodiment of the present invention having at least one LED which illustrates an LED with a relatively wide viewing angle, such as 30.

DETAILED DESCRIPTION

Figure 1:
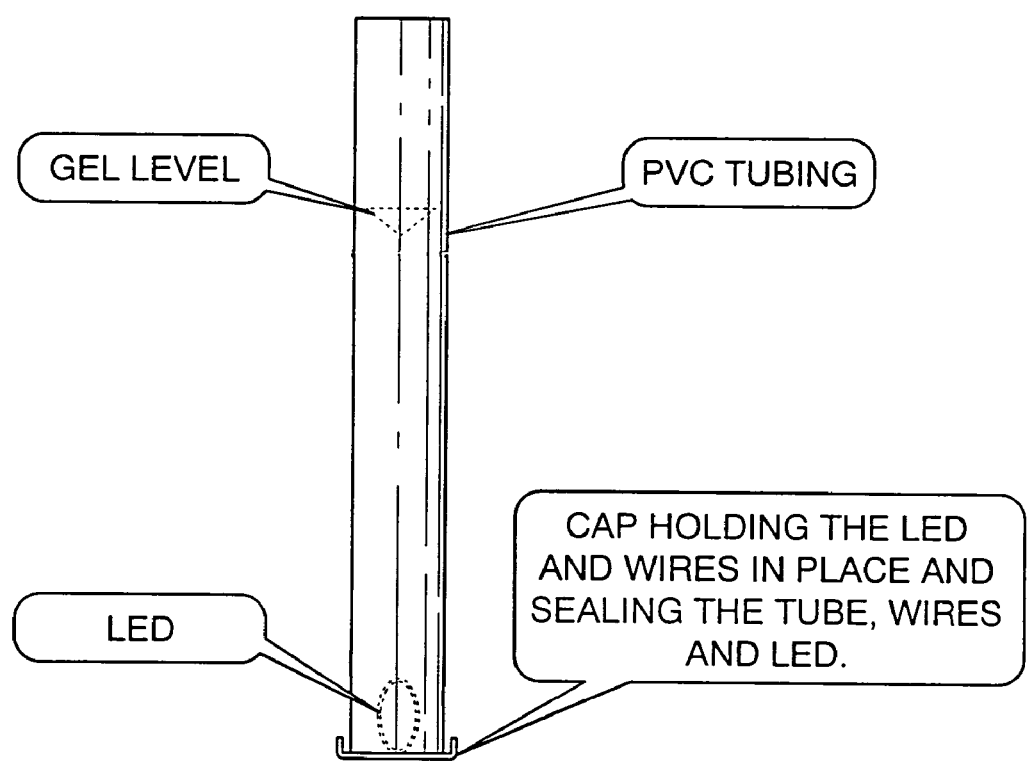
FIG. 1 is a elevational view of an illumination device in accordance with one aspect of the invention.

The present invention relates to a light emitting medium and an illumination system. The light emitting medium includes a container which acts as an outer cladding and a liquid core. The container may be formed from various translucent or transparent materials and shapes. In accordance with an important aspect of the invention, the core is formed from a mixture or aqueous solution of water soluble polymer materials. For example, the core may be formed with up to 99.9% water by volume and at least 0.01% by volume water soluble polymer. The amounts of the water soluble polymer may be increased. As such, the cost of the raw materials associated with the present invention is significantly less than known light guides. Known light guides, for example, as disclosed in U.S. Pat. Nos. 4,261,936, 5,111,526, 5,052,778, 4,957,347, 5,406,641 and 5,485,541, function the same as the light emitting medium in accordance with the present invention; however, the cost of raw materials is much higher. This advantage is particularly more pronounced for light emitting mediums with high volumes, such as a container with a diameter of 50 mm and higher. Furthermore, there is a high chance that bubbles can form or the polymer mass degrade because of highly exothermic polymerization reaction temperatures. Problems also ensue due to excessive shrinkage upon polymerization. Other polymerization methods such as emulsion and solution may result, in a non-transparent masses, which is not conducive to the objectives of the present invention.

Additionally, in many known light guides, fluoropolymers are employed in the production of light guides, for example, as disclosed in U.S. Pat. Nos. 5,052,778 and 4,957,347. These fluoropolymers are very expensive. The fluoropolymers' relatively higher specific gravity, additionally, exacerbates the problem. In order to overcome this shortcoming, the wall thickness are known to have been made very thin and substrates surrounding the fluoropolymer devised. Such systems suffer in many areas. For instance, in the course of polymerization, the high shrinkage of the polymerizing mass causes the fluoropolymer to collapse resulting in a non-uniform cross section. Further, the high shrinkage causes the core to separate from the fluoropolymer, leaving a gap as a result of de-lamination of the core from the cladding. The latter led to the use of heat shrink tubing, which, in turn, introduced more steps in the production of the light guides. The present invention obviates these shortcomings.

Another aspect of the present invention is that the container portion of the light emitting medium in accordance with the present invention is not limited to a circular cross-section which simplifies overall production. For example, containers are contemplated with circular as well as noncircular asymmetrical cross-sections and do not require complicated processing. In contradistinction, U.S. Pat. Nos. 5,052,778, 4,957,347, 4,261,936 and 5,111,526, require that the core cross section be essentially limited to circular cross sections. Known light guides with noncircular cross-sections, such as disclosed in U.S. Pat. Nos. RE36,157; 4,957,347 and 5,052,778 require a series of rather complicated and cumbersome processes for the production of illuminating systems with different cross sections. The light systems of the present invention can easily be configured to have asymmetric and other than round cross sections. The main advantages result from being able to use containers that do not have a round or symmetrical shape, such as a pouch.

Another advantage of the present invention is realized by the aqueous mixture ingredient possibilities, which can render the light system more user friendly, environment friendly, inflammable, partially biodegradable among other positive attributes.

Core Materials

As mentioned above, an important aspect of the invention is that the core of the light emitting medium is formed from a mixture or an aqueous solution of a water soluble polymer. Various water soluble polymers are contemplated for use as the core with the present invention. An exemplary list of water soluble polymers is provided in Table 1 below.

TABLE 1

Agar gums
Alginates
Animal and gelatin glues
Arabic gum
Arrowroot and sago starches
Carboxyalkyl guar
Carboxyalkyl hydroxyalkyl guar
Carboxylic acid, and derivatives
Carboxymethyl celluloses
Carrageenans
Cationic Celluloses
Cellulose
Chitins
Dextran
Gelatins
Hydroxyalkyl guar
Hydroxybutyl methylcellulose
Hydroxyethyl celluloses
Hydroxypropyl celluloses
Locust bean gum
Maleic anhydride resins
Methyl celluloses
Methylene succinate
Pectins
Plantago
Poly olefin-maleic anhydrides
Poly urea formaldehydes
Poly 1-glycerol methacrylate
Poly 1-vinyl-2-pyrrolidone
Polymelamine formaldehydes
Hydrophobically modified cellulose ethers
Poly styrene-maleic anhydrides and styrene sulfonic acids
Poly 2,3 dihydroxypropyl methacrylate
Poly 2,4,6-tribromophenyl acrylate
Poly 2-hydroxyethyl methacrylate/methacrylic acid
Poly 2-hydroxypropyl methacrylate
Polyacrylamide/2-methacryl oxyethyltrimethyl ammonium bromide
Polydihydroxyalkyl acrylate or methacrylate
Polydiisobutylene-maleic anhydride
Polydimethyl diallyl ammonium chlorides
Polydimethyl Isopropenyl benzene
Polyepoxidized alkyl acrylate or methacrylate
Polyethylene glycol-bisphenol A diglycidyl ether adduct, tetraacrylate
Polyethylene oxide-b-propylene oxide
Polyn-butyl acrylate-2-methacryloxyethyl trimethylammonium bromide
Polyn-vinylpyrrolidone-vinyl acetate
Polyn-vinylpyrrolidone-n-vinylpyrrolidinone
Polypropylene glycol monomethacrylate
Polypropyylene oxide or Polypropylene glycol
Polytetramethylene ether glycol-tetrahydrofuran
Poly 2-ethyl-2-oxazoline
Poly 2-vinylpyridine n-oxide
Poly 2-vinylpyridine
Poly 4-vinyl pyridine
Poly 4-vinylpyridine n-oxide
Polyacrylamide/acrylic acid
Polyacrylamide
Polyacrylic acid
Polyacrylicor methacrylic acid
Polyalkyl vinyl ether
Polyamine acrylates
Polyammonium acrylate
Polyammonium methacrylate
Polyaniline
Polybutadiene/maleic acid TABLE 1-continued Polyethoxylated urethanes
Polyethyl oxazolines
Polyethylene-acrylic acid
Polyethylene-maleic anhydride
Polyethylene-acrylic acid
Polyethylene glycol terephthalate
Polydiethylene glycol distearate
Polyethylene glycol
Polyethylenimine
Polyethyloxazolines
Polyitaconic acid
Polyl-lysine hydrobromide
Polymaleic acid
Polymaleic anhydride
Polymethacrylamide
Polymethacrylic acid
Polymethyl methacrylate
Polymethyl vinyl ether
Polyn,n-dimethlyacrylamide
Polyn-isopropylacrylamide
Polysodium acrylate
Polystyrene sulphonic acid
Polystyrene
Polystyrenesulfonic acid
Polyvinyl acetate
Polyt-butyl methacrylate
Polyvinyl Alcohol
Polyvinyl methyl ether
Polyvinyl phosphoric acid
Polyvinyl pyrolidone
Polyvinyl pyrrolidones
Polyvinylamine
Polyvinylamine hydrochloride
Polyvinylphosphonic acid
Polyvinylpyrrolidones
Polyvinylsulfonic acid
Polydextroses
Starches
Styrene-maleic anhydride
Styrene-acrylic
Various gums
Vinyl ethers
Xanthan Gums Any derivatives, forms, combinations of the water-soluble polymers disclosed in Table 1 including water-soluble salts, anionic, cationic, nonionic, cross-linked and non-cross-linked, modified and unmodified species combined and derived from monomers, pre-polymers, polymers, co-polymers may be used in this invention.

Moreover, some of the above materials may be cross-linked into hydro-gels, for example, as disclosed in U.S. Pat. Nos. 3,947,401, 4,450,262, 4,540,743, 4,492,776, 4,640,965, 4,694,037 5,270,418 and 6,312,706, hereby incorporated by reference. In general, these patents disclose methods for cross-linking water-soluble monomers, pre-polymers and co-polymers and/or combinations thereof into hydro-gels. The cross-linking may be done in-situ with the appropriate cross-linkers. There are no limitations on how the cross-linking may be undertaken, for instance, heat may be used to initiate the reaction, or methods such as UV curing as disclosed in U.S. Pat. Nos. 5,010,141, 5,532,287 and 5,955,242, hereby incorporated by reference among other methods. It is also noted that UV-curable hydrophilic pre-polymers and polymers and water-swelling polymers may also be used. For example, silicone-containing hydro-gels, or derivatives thereof such as the ones disclosed in U.S. Pat. Nos. 4,640,941, 5,010,141, 5,387,632, hereby incorporated by reference.

Additionally, the core compositions of the present invention allow easier inclusion of light dispersing agents such as glass or metal flakes, fluorescing, frequency shifters, microbubbles among others. The cross-linked compositions, aid in holding, such particles in place.

The polymerization reactions, such as the ones disclosed in U.S. Pat. Nos. 4,957,347 and 5,406,641 are exothermic, limiting the inclusion of some fluorescing and light dispersing compounds due to thermal degradation. Further, the monomers disclosed in U.S. Pat. Nos. 5,052,778 and 4,957,347 have relatively low viscosity monomers to begin with, which prohibit inclusion of relatively higher dense particles, such as microbubbles, by allowing the particles to precipitate out of solution prior to polymerization, resulting in non-uniform light guides. In processes, such as disclosed in U.S. Pat. Nos. 4,261,936 and 5,111,526, the melted polymer mass offers a relatively higher viscosity for inclusion of light dispersing agents; however, the high extrusion temperatures cause damage to the light dispersing agents. With liquid optics, the precipitation problems may also be encountered.

The water-soluble polymer materials of the present invention allow a highly viscous mixture to be prepared for more accommodative inclusion of various light dispersing agents, prior to placement inside the container. The process can take place at room temperature or slightly higher temperatures. The dispersing agents may be introduced at various stages of production. In one exemplary embodiment of the present invention, 0.015 Hex/VM 2000 Glitter provided by Minnesota Mining and Manufacturing, St. Paul, Minn. was mixed with a water-soluble polymer, Cellogen HP-12HS supplied by Montello, Tulsa, Okla., for example, 97.95% water by weight, 0.05% glitter by weight and 2% water soluble polymer by weight, at 70° C., under vacuum, using a static mixer to form a uniform aqueous mixture. The temperature was subsequently decreased to room temperature over several minutes. The mixture was forced into a thermoplastic polyurethane tubing obtained from Ark-Plastics, Inc., Flipping, Ark. A 100 cm light emitting device lit at each end by an LED supplied by Kingbright, Inc., Walnut, Calif. exhibited a dazzling, yet uniform illumination.

In one embodiment of the light emitting device of the present invention, the aqueous mixture is injected into a container at temperatures in the range of 25° to 70° C. Poly-vinyl chloride, fluoropolymers, such as fluorinated ethylene propylene (FEP) and tetrafluoroethylene, hexafluoropropylene, vinylidene fluoride terpolymer (THV), both supplied by Dyneon, St. Paul, Minn., for instance, thermoplastic elastomers, such as thermoplastic polyurethane supplied by BASF, Mount Olive, N.J., flexible polyolefins, such as Engage supplied E. I. DuPont, Wilmington, Del., among other flexible; or rigid polymers, such as poly methyl methacrylates, supplied by Rohm and Haas, Philadelphia, Pa., poly(carbonate) supplied by GE Plastics, Pittsfield, N.J., may be used for the containers.

There is no limit on how an aqueous mixture or hydro-gel is formed. The aqueous mixture can be a mixture of natural or synthetic, linear or cross-liked, dimers, trimers, oligomers, macromer or polymer, used individually or in combinations thereof in water. The polymer can be as a result of block, bulk, solution, cationic, anionic, free radical or any other from of polymerization. The polymerization may be in-situ within the container or partially external and completed within the container. The final polymer in the aqueous mixture may be linear or cross-linked.

There is no limit on what other ingredient is added to enhance the properties of the aqueous mixture or hydro-gel. For instance, salts, glycols, alcohols among other ingredients may be added to depress freezing point, increase refractive index, transfer heat of polymerization or aid in the processing.

Container

It is appreciated that there is no limit to the different shapes of the container, although a cylindrical tube can be more advantageous in some circumstances. The container can have a symmetrical, non-symmetrical, circular or non-circular cross-section. The fabrication of containers having different shapes is well within the ordinary skill in the art. There is no limit on the material of the container, although a container with low refractive index, highly transparent and free of microstructures can be more advantageous in some circumstances. The container can have a refractive index that is higher or lower than the core. Containers, such as polyethylene with a higher crystallinity (i.e. high density polyethylene) vs. linear low density polyethylene exhibit excessive absorption of light by the material of the container, limiting some applications. Conversely, clear, cast polymethyl methacrylates tubes containing an aqueous mixture in accordance with the present invention appear more brilliant than extruded tubes of polymethyl methacrylates containing the same mixture. It is speculated that the material of the extruded tube may have contained impurities as a result of emulsifiers used during the resin manufacturing, or introduced during extrusion, resulting in absorption of light by the impurities.

The process for making the embodiments of the present invention can be fully automated and continuous. For example, the aqueous mixture may continuously be inserted into tubing as the tubing is being formed through a conventional extrusion process. Downstream, the tubing containing the core material can be pinched off, cut and a light source placed in and sealed. Conventional methods for placing and sealing can easily be used. Multiple layered tubing can also be used.

The container is filled with an aqueous mixture. LED components may be inserted at each end to contain the aqueous mixture. When such a light system is activated, the container illuminates. For a tubular-shaped container, the container glows resembling neon. The same mixture introduced into a pouch-shaped container (i.e. heart-looking or star-looking pouch), made from polymers disclosed above, and lit by an LED, makes the pouch glow like a lamp. The container material may be a multi-layered. In order to eliminate any chance of water escaping from the container, a multi-layered container including a barrier layer may be used. The barrier layer may actually be a tie-layer, or be the layer in contact with the aqueous mixture or be the outermost layer of the container.

EXAMPLES

Example 1 a 50 cm long, 6 mm inside diameter, regular, clear PVC (polyvinyl chloride) was filled with a water-soluble gel made mostly from de-ionized water, and Keratin/Collagen protein and other ingredients listed by LaBella Professional Formula Styling Gel—Distributed by Newhall Laboratories, Inc., Santa Clarita, Calif. 91350. An Agilent LED (HLMT-PG00) was inserted at one end of the tube, immersed in the gel and lit. The LED was installed within a cap that after installation completely sealed the tube and located the LED within the gel, FIG. 1. The aqueous illuminating light emitting device glowed very similar to prior art material—like an optic from Poly-Optics Australia Party. Ltd., Queensland, Australia lit by an LED placed at the core face. By this method, a substantial part of the light emitted from the LED was captured within the light emitting device by the principle of total internal reflection. Further, the material of the core, essentially water, advantageously provided a less costly method for forming the core.

Example 2 a 50 cm long, 6 mm inside diameter THV, (fluorinated ethylene propylene) and (perfluoroalkoxy) terpolymer, or better known as tetrafluoroethylene hexafluoropropylene vinylidene tube was filled with a water-soluble polymergel mostly made from de-ionized water, and Keratin/Collagen protein and other ingredients listed by listed by LaBella Professional Formula Styling Gel—Distributed by Newhall Laboratories, Inc., Santa Clarita, Calif. 91350. An Agilent LED (HLMT-PG00) was inserted at one end of the tube, immersed in the gel and lit. The LED was installed within a cap that after installation completely sealed the tube and located the LED within the gel, FIG. 1. The aqueous illuminating light emitting device glowed very similar to prior art material—like an optic from Poly-Optics Australia Party. Ltd., Queensland, Australia lit by an LED placed at the core face.

Example 3

Example 2 was repeated with adding an equal amount of a mixture of salt and water—10% by weight sodium chloride in distilled water. The salt was added to increase the refractive index, depress the freezing point and decrease the viscosity. An Agilent LED (HLMT-PG00) was inserted at one end of the tube and lit. The linear light emitting device glowed from the sides and transmitted part of the light to the solution-air interface, apparently exhibiting more transmission and less light scattering compared to Example 2 above.

Example 4

Example 1 was repeated after metal glitters were mixed within the gel. The glitters caused scattering of the light, but hindered the transmission of the light.

Example 5

Example 1 was repeated after colored glass particles were mixed within the gel. The colored glass caused scattering of the light and less light transmission.

Example 6

Example 1 was repeated, the gel was placed in a tubing with an oval cross section. The same results were obtained.

Example 7

Example 1 was repeated, the gel was placed in a linear low density container shaped like a bag. The container was lit, but not uniformly.

Example 9

Example 2 was repeated, the construction of the tubing consisted of very thin wall THV (less than 0.2 mm) within a thicker PVC tubing—a multi-layered container. The system was more robust in handling.

Example 10

Example 2 was repeated using an aqueous solution of Polyglycol P425 supplied by The Dow Chemical Company, Midland, Mich. The linear light emitting device glowed from the sides and transmitted part of the light to the solution-air interface, apparently exhibiting more transmission and less light scattering compared to Example 2 above.

Illumination System

The light emitting device discussed above may be combined with other components to form an illumination system. In particular, the light emitting device may be combined with one or more illumination assemblies to form an illumination system. In particular, one embodiment for supplying light into the containers of the present invention or into a volume of transparent, light conducting material is an illumination assembly which contains any combination of LEDs, light directing component(s), reflector and/or refractor component(s), switching device(s), logic component(s), control(s) and energy component(s), or any other components attributing to the propagation of light, for example, as illustrated in FIG. 2.

As shown, the illumination assembly, generally identified with the reference numeral 20, can be incorporated on one or both ends of a light emitting device, as discussed above, to form an illumination device as generally illustrated in FIG. 1. The illumination assembly 20 includes an LED 20, a power supply 22, a switching device 24 on optional reflector 26. The LED 20, power supply 22, switching device 24 and reflector may be contained in a resin material 28, such as rigid epoxy or polyurethane. In an embodiment of the invention in which the container is formed as a tube, the illumination assembly may be inserted into one end of the tube.

The illumination device is immersed or projecting light into the light transmitting medium of the present invention. The embodiment furthermore may be integrally enclosed within the container.

A cluster of LEDs are advantageous in some embodiments, as generally shown in FIG. 3. For example, a cluster of LEDs 30, 32, 34 of the three primary colors (red, green and blue) makes it possible to digitally address each LED to produce different colors and different intensities. The angle of propagation of light determines the light properties in the light transmitting media—for example an LED with a 30 degree viewing angle, in comparison to the same LED with a 15 degree viewing angle, propagates light differently into the containers of the present invention, and consequently, the illumination device transmits differently. A cluster of LEDs arranged sparsely on a substrate, in comparison to a cluster of the same number LEDs arranged more compactly, project light differently into the into the containers of the present invention. These observations are more easily understood by the following diagrams and examples.

Figure 5:
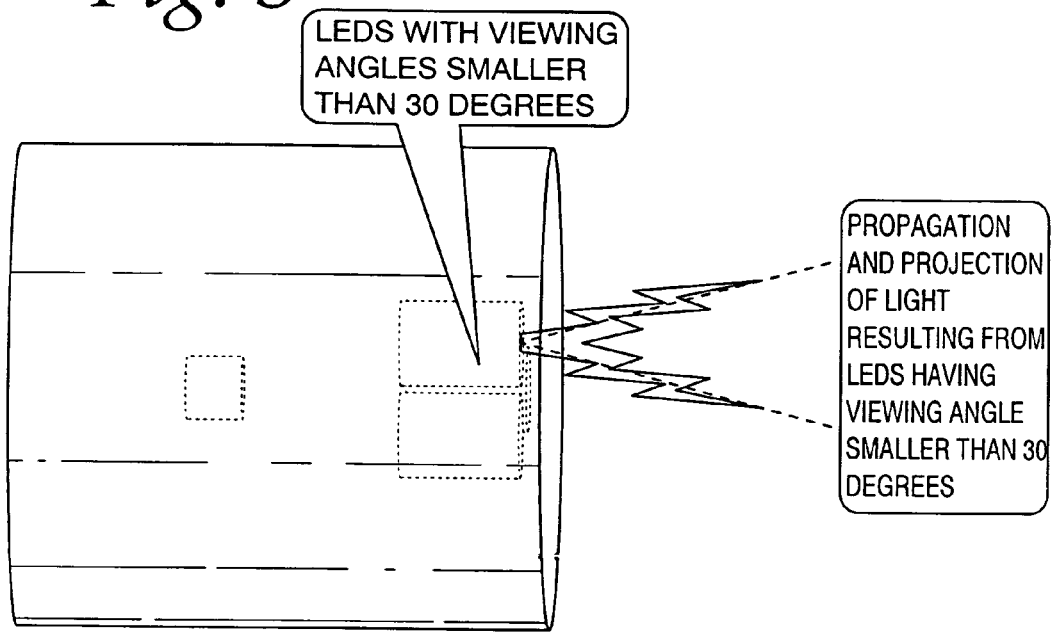
FIG. 5 is similar to FIG. 4 but illustrating an LED with a relatively small viewing angle, such as less than 30.

FIGS. 4 and 5 illustrate two embodiments; one with the LEDs each having a larger than 30 degree viewing angle, and one with LEDs each having a smaller than 30 degree viewing angle. Such embodiments can be prepared using 3 each of 3-mm LEDs assembled onto an embodiment with a 12 mm outside diameter. The embodiments are installed onto a container of the present invention; in this instance, a linear container being approximately 1,200 mm long, with an inside diameter of 12 mm, an outside diameter of 14 mm, having a uniform round cross section and capped at both ends with a clear plug. The assembly consisting of LEDs with a viewing angle lower than 30 degrees propagated the light further along the optic and looked to be more uniformly illuminating.

Figure 6:
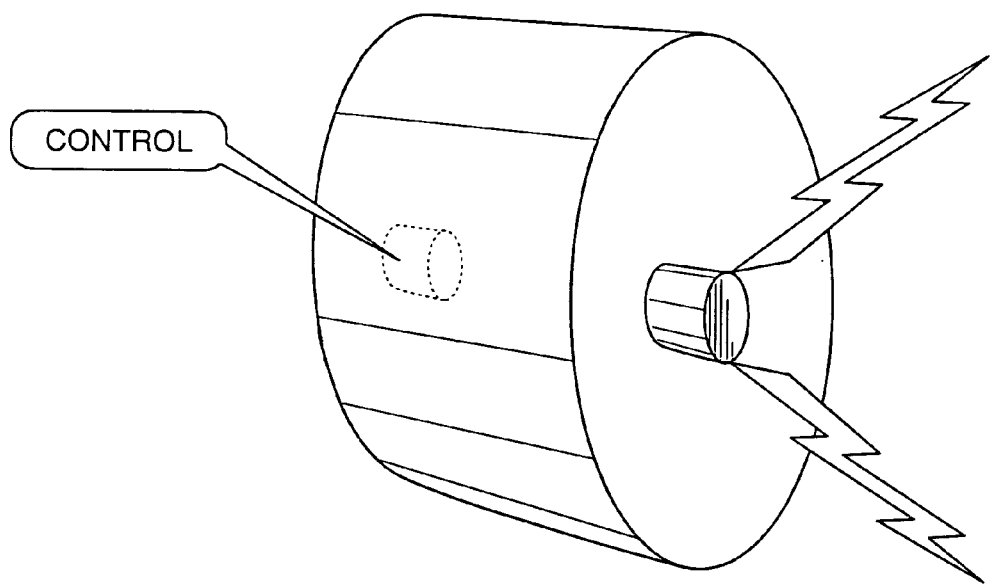
FIG. 6 is a perspective view of one embodiment of the invention illustrating a control device.
Figure 7:
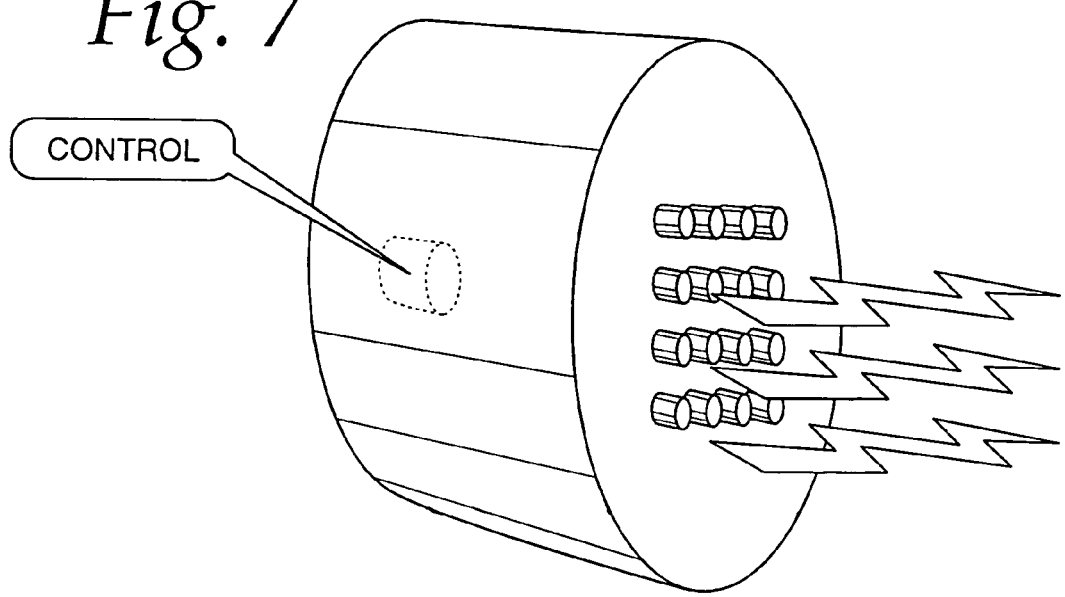
FIG. 7 is similar to FIG. 6, but for an embodiment which includes an array of LEDs.

FIGS. 6 and 7 illustrate two other embodiments; one with one LED with a 30 degree viewing angle, and one with a cluster of LEDs each having a smaller than 30 degree viewing angle. Such embodiments were prepared as follows: in one using one 5-mm LED assembled onto an embodiment with a 12 mm inside diameter, and in one a cluster of 3 by 3 LED chips, each being subminiature LEDs with approximate 2 mm dimension having a 15 degree viewing angle and placed essentially next to each other. The embodiments are installed onto a container of the present invention; in this instance, a linear container being approximately 1,200 mm long, with an inside diameter of 12 mm, an outside diameter of 14 mm, having a uniform round cross section and capped at both ends with a clear plug. The assembly consisting of LED cluster propagated the light further along the optic and looked to more uniformly illuminated from the sides.

Figure 8:
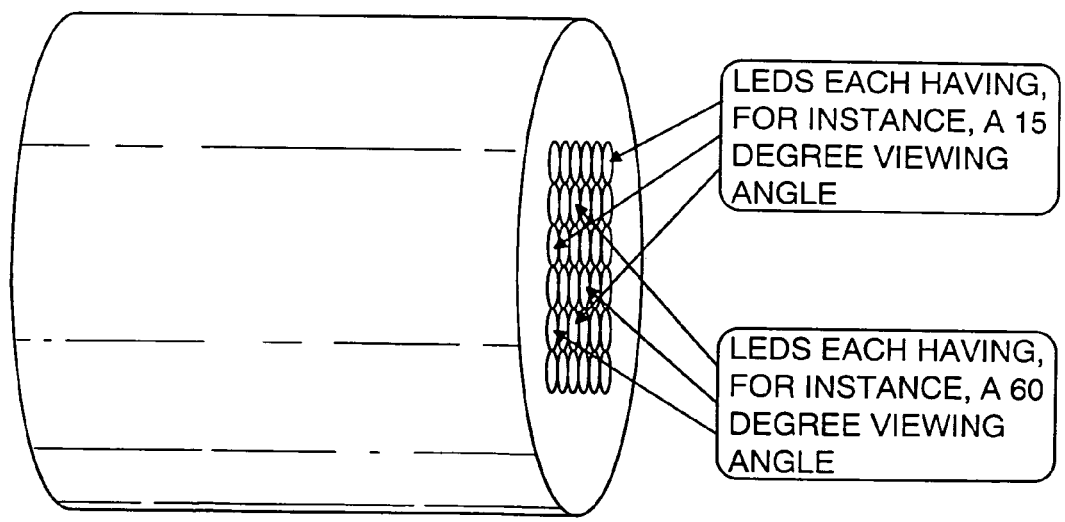
FIG. 8 is similar to FIG. 7 but illustrating an array of LEDs with different viewing angles.

FIG. 8 illustrates an embodiment as depicted with a 12 mm outside diameter, with a cluster of subminiature LEDs with approximate 2 mm dimension having a viewing angle from 15 to 125, and placed essentially next to each other. The outer LEDs having a wider viewing angle than the inner LEDs contributing to, for instance, a more collimated and more directional light propagation. This embodiment was not assembled onto any of the optics of the present invention.

In one illumination system of the present invention, LEDs are selected with an overall OD larger than the inside diameter of the openings of the container. The container is filled with the appropriate core material and partially inserting the round tip of the LEDs into each end. A heat shrink tubing is placed over the LED and the container and shrunk to hold the LED in place. Although the OD of the LED was larger than the ID of the container; nonetheless, the force exerted on the back of the LED by the heat-shrink tubing expanded the tubing container ID, allowing the LEDs to be held in position. Next, caps with predetermined inside diameter and appropriate outlets for the LED leads to protrude through are mounted onto the end of the container. This container was subjected to temperatures of −10° C. for 1 day and 70° C. for 1 day without observing any material loss or damage.

In one configuration, a cap is used having the same material as the container and mounted onto the container as discussed above. The cap is heat sealed onto the container to seal around the leads, creating electrical insulation around the leads and also rendering the leads stronger for handling. There are other configurations possible. Altogether, the above configurations all have one factor in common, that is that the embodiment is integrally attached to the container of the present invention.

APPLICATIONS OF ILLUMINATION DEVICE

LEDs in their pure form are "monochromatic". As such, the light emitted from a single color LED has a very narrow frequency range and can only transmit light through a body of similar frequency. Most advantage (maximum transmission) is achieved when the frequency of the LED and the transmitting medium are exactly matching.

The above phenomenon can be used in different manners to create efficient lighting systems when combined with the lighting systems of the present invention.

A tubular lighting system of the present invention with a series of deformations (i.e. similar to holograms), on the surface of the tube, fitted with two different color LEDs, and turned on and off alternatively makes deformations appear to be in motion on the outer surface of the tube. The deformations appear brighter and darker at different LED color frequencies. The deformations appear to react differently to each frequency. The deformation may be formed, for example, created by embossing during extrusion or embossing after extrusion or by imprinting a UV durable ink and then curing by UV exposure.

A series of holograms, indentations and or deformations, when formed in a progressive manner and at different degrees of deformation, respond differently to each frequency of light. Accordingly, a proper sequence and proper deformations subjected to different light frequencies appear in motion. For instance, a glass container of the present invention, imprinted with a pattern including indentations and deformations like an imprint, a next pattern that includes the same pattern with a slightly different depth and orientation, a next pattern that includes the same pattern with yet a slightly different depth and orientation compared to the previous one—for instance twice as much as the first one was prepared and lit with LEDs of two different colors. The imprints reacted differently to the intensity and colors. A rapid and systematic change of intensity and color in a predetermined manner made the imprints to appear to be in motion.

In an application of illumination system of the present invention, a tubular container, different patterns using different transparent or translucent inks may be printed onto the surface of the optic—for instance, patterns depicting stars. The stars are printed in, for instance in 3 distinct transparent frequencies of 470 nano-meter (blue), 590 nano-meter (green) and 625 nano-meter (red). The area of the surface of the optic that does not contain the imprinted stars is blackened off. Three LEDs capable of producing the exact frequencies of 470, 590 and 625 nano-meters are included within the embodiment. Now, in sequence, if the red LED is turned on first, the green LED is turned on second and the blue LED last; and the order is repeated in a predetermined intervals, the red star lights up first, then the green and last the blue. In such a manner, it seems that the stars are in motion and traveling on the surface of the embodiment. This is because, when the red LED comes on, the light can only be transmitted through the red star and not the blue or green, conversely when the green LED comes on it only can transmit through the green star and not the blue or green and so on—this sequence of red, green, blue if repeated creates a motion of the stars on the surface of the embodiment.

Obviously, many modifications and variations of the present invention are possible in light of the above teachings. Thus, it is to be understood that, within the scope of the appended claims, the invention may be practiced otherwise than as specifically described above.

The invention claimed is:

1. A light emitting medium comprising:
    a container which acts as a cladding;
    a core disposed within said container, said core formed from a mixture of a water soluble polymer;
    at least one light source which includes a plurality of LEDs, wherein the viewing angles of said plurality of LEDs is different.

* * * * *